Jan. 24, 1956 W. E. COWLEY 2,731,991
MOLDING HEAD AND CUTTER
Filed June 15, 1953
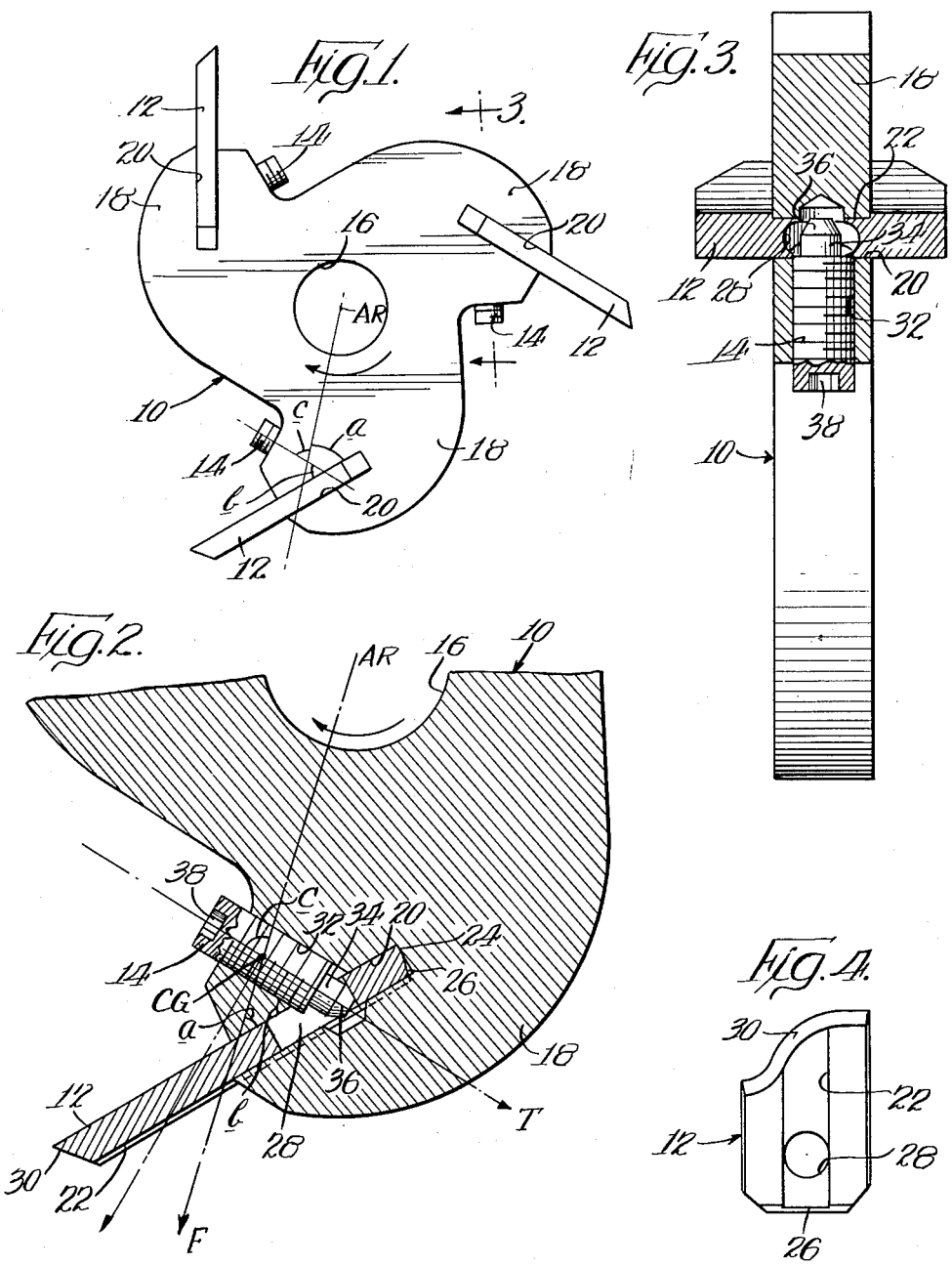
INVENTOR.
William E. Cowley
BY
Brown, Jackson, Boettcher & Dienner
Attys.

United States Patent Office 2,731,991
Patented Jan. 24, 1956

2,731,991

MOLDING HEAD AND CUTTER

William E. Cowley, Louisville, Ky., assignor to American Saw & Tool Company, Louisville, Ky., a corporation of Kentucky Application June 15, 1953, Serial No. 361,677

3 Claims. (Cl. 144—229)

The present invention relates to improvements in molding heads and cutters, and particularly to improved means for mounting and securing the cutter bits in the head.

Molding cutters are well known and comprise generally a head or body adapted to be rotated and a plurality of circumferentially spaced cutter bits or blades detachably secured to the head and extending from the periphery thereof. Each blade or cutter bit is adapted to be provided with a cutting edge or surface complementary to one of a variety of wood molding forms. In use, the head is rotated by suitable means, such as an electric motor, and the work, a strip of wood, is engaged with the rotating cutters and is moved bodily, longitudinally of its length, with respect to the head and cutters whereby a molding strip is formed.

As will be appreciated, the circumferentially spaced cutter bits engage the work with substantial impact, so that considerable vibration is set up in the cutters and head. Due to such impact and vibration, conventional means utilized for detachably securing the cutters to the head will tend to loosen in use, whereby, particularly upon continued rotation of the head in the absence of a work piece, the blades or cutters may be flung centrifugally from the head. The dangers of such condition will be obvious when one considers that the peripheral speed of the head will run as high as 10,000 to 12,000 feet per minute.

It is an object of the present invention to provide improved molding head and cutter means that obviates the above noted objection and provides a safe, efficient and economical tool.

In particular, it is an object of the present invention to provide an improved molding head and cutter including cutter bit fastening means responsive to impact, vibration and centrifugal force to exert a tightening force on the bit, as opposed to the loosening of conventional fastening means.

Another object of the invention is to provide an improved molding head and cutter including cutter bit fastening or securing means that is not directly subject to the impact of the cutter, but is adapted to be responsive to the vibration of the head resulting from such impact, and that is responsive, to be tightened, to centrifugal force exerted thereon.

According to the present invention, I provide a molding head and cutter comprising a head having a peripherally open slot therein, a cutter bit adapted to be positioned in said slot to extend from the periphery of said head, and securing means adjustably mounted in the head and intersecting said slot to lock the bit in the slot.

Generally speaking, the construction as thus far defined is not new. What is new is this: First, the securing means, preferably a screw, is disposed to the forward side of the bit in the direction of rotation, so that the impact on the bit when engaging a work piece is transmitted to and absorbed by the head, not the screw; second, the bit is adapted normally to abut against the back wall and bottom of the slot in the head, which are the surfaces against which the same is forced by cutting impact; third, the bit is provided with a hole therethrough in the portion thereof received in said slot adapted for passage of the screw, the hole being larger than the screw and the screw being adapted to engage the cylindrical surface of the hole adjacent the inner end of the bit, whereby the screw positively blocks removal of the bit from the slot and whereby movement of the screw and the bit in a direction inwardly of the head is accommodated; and fourth, the screw is so mounted that the angle between the axis of the screw, to the outer end thereof, and a radius of the head passing through the center of gravity of the screw is less than 90 degrees, whereby a component of the centrifugal force acting on the screw exerts a tightening force on the screw. In use then, the cutter bit is adapted to be forced against the bottom and back walls of the slot in the head each time the bit engages a work piece. Such impact causes vibration of the head, which vibration in turn tends to cause "walking" of the fastening means. Due to the exertion of a component of centrifugal force in a tightening or inward direction on the screw, such "walking" must take place in a tightening direction. Thus, if a bit is not properly positioned or accurately or securely fastened in the head in the first place, subsequent use of the tool will automatically result in accurate positioning and positive locking of the bit in the head, for as the bit engages the work the same is forced, against the centrifugal force acting thereon, to the bottom of its slot, which movement is accommodated by the hole in the bit, thus alleviating any load on the screw, whereby the screw is capable of "walking" inwardly to a position wherein the same will positively lock the bit in the head. As will be apparent to those skilled in the art, the advantages of such structure are numerous. In particular, the substantial dangers consequent upon blade loosening are eliminated. Furthermore, when the tool is rotating freely in the absence of a work piece, the disposition of the screw is such that the component of centrifugal force acting directly thereon and axially thereof offsets or counteracts any secondary and loosening force that could be exerted thereon due to centrifugal force acting on the bit.

A further object of the invention is the provision in molding heads and cutters of a simplified arrangement whereby the cutter bit is positively retained and secured to the head in a ready and convenient manner.

A still further object of the invention is the provision of a highly economical and practical molding head and cutter structure consisting solely of a head, one or more cutters mounted on the head, and a single fastening screw for each of the cutters.

Other objects and advantages of the present invention will become apparent in the following detailed description of a preferred embodiment of the invention.

Now, in order to acquaint those skilled in the art with the manner of making and using the molding head and cutter of the present invention, I shall describe, in connection with the accompanying drawings, a preferred embodiment of my invention and a preferred manner of making and using the same.

In the drawings:

Figure 1 is a side elevation of the molding head and cutters of the present invention;

Figure 2 is a partial vertical section of the head, on an enlarged scale, showing one cutter and its mounting in detail;

Figure 3 is a sectional view of the head and one cutter, the view being taken substantially on line 3—3 of Figure 1; and Figure 4 is an elevational view, on a reduced scale, of one of the cutter blades or bits.

Referring now to the drawings, I have shown a preferred embodiment of my invention as comprising a head or head member 10 carrying a plurality of cutters or cutter bits or blades 12 each secured to the head 10 by means of a fastener or fastening or securing device 14. The head 10 preferably comprises a flat, generally plate-like member having a hole or aperture 16 extending through the central portion thereof. The aperture 16 is adapted for the reception of a suitable drive shaft whereby the head 10 is adapted to be rotated about an axis transverse to the plane thereof. The head includes a plurality of outwardly extending lobe portions 18, which are circumferentially spaced equally around the body or central portion of the head. The head 10 and its lobes 18 may take a variety of forms, but that shown is preferred wherein the central or body portion of the head may be circumscribed by a circle and each lobe has a configuration somewhat similar to an involute of a circle (a circle other than the body circle). Each lobe 18 is provided with a slot or recess 20 therein which is open peripherally and laterally of the head. The slot or recess 20 in each lobe is preferably disposed at such inclination to all lines passing through the axis of rotation, AR, of the head and intersecting the slot as to define an angle of less than 90 degrees between any such line and the inner end or bottom of the slot, as is indicated at $a$ in the drawings. Each of the slots 20 as thus formed is adapted for the reception of a cutter bit or blade 12.

Each bit 12 is formed of plate stock and is of a thickness greater than the width or thickness of the slot 20, of a length greater than the depth of the slot 20, and of a width greater than the thickness of the head 10. To accommodate entry of the blade 12 into the slot 20, the blade is provided in one face thereof with a central longitudinal shallow groove or slot 22 of a width substantially equal to the thickness of the head 10 and of a depth to reduce the thickness of the blade at that portion thereof to the width or thickness of the slot. When inserted in a slot 20, the cutter or blade 12 projects at an inclination outwardly from the periphery of the respective lobe 18 and the head 10 is adapted to be rotated in the direction of such inclination. In other words, the blade 12 and the slot 20 are inclined in the direction of rotation of the head 10 from the inner to the outer ends thereof. The groove 22 in the blade 12 is preferably provided in the rear face of the blade so that the blade is adapted for the conformable reception of that portion of the head or lobe defining the rear wall of the slot to grip that wall and prevent lateral disassociation of the head and blade.

The inclination of the blade and slot in the manner defined is of particular advantage in that the blade is thus so disposed in use that as the same engages a work piece, as the head 10 is rotated, the blade is forced against the back wall and the bottom of the slot 20 where it is firmly and accurately supported. This leads further to the advantage that the cutters are thus always accurately positioned against the bottom of the slot so that all of the blades extend equal distances from the periphery of head 10 and the cutting edges lie on the same circumference to effect an even and uniform cut. To insure accurate seating in the bottom of the slot, the blade is preferably flat only at a portion of its bottom edge, as is indicated at 24, preferably the portion adjacent the front face of the blade where the impact load occurs when cutting, and the remainder of the bottom edge is inclined, as indicated at 26, preferably at an angle of approximately 1 degree, so that chips, dust and the like will not prevent accurate seating of the blade in the slot. Within the groove 22, each cutter or cutter blade 12 is provided with a circular aperture or hole 28 for a purpose to be described, and at its outer edge 30 is shaped to complement any desired molding shape, whereby the cutter may cut a desired molding from a strip of wood or the like.

The securing means or fasteners 14 may take a variety of forms but preferably comprise screws adapted to be inserted in tapped bores 32 provided in each lobe 18 of the head 10. The bores 32 are positioned forwardly of the slots 20 in the direction of rotation of the head 10 and are each formed to intersect the slot 20 in the respective lobe 18. The bore 32 is so disposed that the axis of the bore is inclined with respect to the slot 20 to define an angle of less than 90 degrees between the open ends of the bore and the slot, as is indicated at $b$. In this manner, a screw 14 inserted in the bore will force the cutter 12 against the bottom and back wall of the slot, the same as occurs when the cutter engages a work piece. By disposing the screw to the forward side of the blade, the screw is not subjected to the impact load when the blade engages the work piece, thus substantially relieving stress application on, and the design strength requirement of, the screw. At its inner end, the screw 14 is provided with a reduced extension 34, of a diameter smaller than the hole 28 in the cutter, adapted to enter the hole 28 and having a frusto-conical end 36 adapted to engage a portion of the wall or cylindrical surface of the hole, adjacent the inner end of the cutter, to force the cutter into place and to retain the same in the head 10. The taper of the portion 36 of the screw 14 is preferably the complement of the angle $b$ to insure intimate engagement of the end 36 and the surface of the cutter defining the hole 28, and also to effect resolution of any force exerted between the cutter and the screw axially of the screw and substantially longitudinally of the cutter. By providing the portions 34 and 36 of the screw of smaller diameter than the hole, relative movement of the blade in an inward direction is accommodated to avoid stress application on the screw upon engagement of the blade with a work piece, particularly if the blade or cutter were held relatively loosely by the screw.

In addition to the above, each bore 32 is so formed as to position the screw 14 in such manner that the included interior angle between the axis of the screw, to the head end of the screw, and a line passing through the axis of rotation, AR, of the head and through the center of gravity, CG, of the screw is less than 90 degrees, as is indicated at $c$. In other words, the arrangement is such that the angle between the axis of the bore to the open end thereof and a line extending from the axis of rotation of the head and to, not beyond, the center of gravity of the screw is less than 90 degrees. Due to such arrangement, the centrifugal force acting on the screw 14 upon rotation of the head 10, as indicated by the arrow F, includes a component acting axially of the screw in such direction as to force the screw inwardly, or in a tightening direction, as is indicated by the arrow T. Thus, any untightening reaction on the screw due to centrifugal force acting on the blade is counteracted and overcome. Accordingly, the blade will be held tightly and securely in its slot. Furthermore, since the blade or bit when performing work is forced inwardly due to its engagement with a work piece to set up impact and vibration in the head, which vibration tends to effect threading or "walking" of the screw, the exertion of force in an inward direction on the screw is adapted to effect "walking" of the screw in a tightening direction to take up any slack that may exist between the blade and the screw, particularly at such time as the blade is forced to the bottom of its slot by engagement with a work piece. Thus, even if the screw were not initially tightened securely, use of the molding head and cutter would automatically effect a secure tightening of the screw.

Since the angle $c$ decreases as the force line F, passing through the center of gravity, CG, of the screw is moved toward the inner end of the screw, thus to increase the magnitude of the force component T, it is preferable to employ a screw having its center of gravity as close to the inner end thereof as is practical. Accordingly, I prefer to employ a headless screw of the Allen type provided merely with a hexagonal socket 38 for the reception of a tightening tool or wrench. Conventional headless screws may also be employed to advantage. To provide the angle $c$ of less than 90 degrees, the bore 32 is formed to provide an angle of less than 90 degrees between the axis of the bore to the open end thereof, and any line passing through the axis of rotation of the head and any point between the longitudinal center of the bore and the inner end thereof, and preferably throughout the full length of the bore.

In view of the foregoing, it will be appreciated that the present invention provides a highly efficient and practical structure that is extremely economical of manufacture and assembly. The component parts are readily made and assembly of the parts is simplicity itself. Yet, the resultant structure is entirely safe in use, and the feature of automatic tightening of the blade and fastening devices insures against damage resulting from careless or inefficient assembly of the blades and head, particularly in a home work shop.

While I have described what I regard to be a preferred embodiment of my invention, it will be appreciated that various changes, rearrangements and modifications may be made therein without departing from the scope of the invention, as defined by the appended claims.

I claim:

1. A molding head and cutter comprising a head member adapted to be rotated about a given axis in a given direction, said head member having a peripherally open slot therein, a cutter bit positioned in said slot and including a portion extending beyond the periphery of said head member, said slot being inclined forwardly and peripherally outwardly from the inner end thereof to the periphery of said head member in the direction of rotation of said head member whereby said bit upon engagement with a work piece is forced against the bottom and the back wall of said slot, said head member having a bore therein extending from forwardly of said slot in the direction of rotation of said head member into said slot, and a screw threaded in said bore and engaging said bit, said bore being inclined with respect to said slot to define an angle of less than 90 degrees between the open ends of said slot and said bore whereby said screw is adapted to force said bit against the bottom and back wall of said slot, said screw having an axially located center of gravity, the axis of said bore being inclined with respect to a line extending from the axis of rotation of said head member to the center of gravity of said screw in such direction as to define an angle of less than 90 degrees between the head end of said screw and said line, whereby said screw is continuously biased upon rotation of said head member by a component of the centrifugal force acting thereon into forcible engagement with said bit.

2. A molding head and cutter comprising a generally plate-like head member adapted to be rotated about a given axis transverse to the plane thereof in a given direction, said head member having a peripherally open slot therein, a cutter bit positioned in said slot and including a portion extending beyond the periphery of said head member, said slot being inclined forwardly and peripherally outwardly from the inner end thereof to the periphery of said head member in the direction of rotation of said head member whereby said bit upon engagement with the work piece is forced against the bottom and the back wall of said slot, said cutter bit being of a width greater than the thickness of said head member and having a groove in the rear face thereof adapted for the conformable reception of said head member to retain said bit against lateral movement in said head member, the bottom edge of said bit including a flat portion adjacent the front wall of said slot engageable with the bottom of said slot and being inclined rearwardly of said flat portion to be spaced from the bottom of said slot, said head member having a bore therein extending from forwardly of said slot in the direction of rotation of said head member into said slot, and a screw threaded in said bore and engaging said bit to retain said bit in said head member against longitudinal movement, said bore being inclined with respect to said slot to define an angle less than 90 degrees between the open ends of said slot and said bore whereby said screw is adapted to force said bit against the bottom and the back wall of said slot, said screw having an axially located center of gravity, the axis of said bore being inclined with respect to a line extending from the axis of rotation of said head member to the center of gravity of said screw in such direction as to define an angle of less than 90 degrees between the head end of said screw and said line, whereby said screw is continuously biased upon rotation of said head member by a component of the centrifugal force acting thereon into forcible engagement with said bit.

3. A molding head and cutter comprising a flat generally plate-like head member adapted to be rotated in a given direction about an axis transverse to the plane thereof, said member having a plurality of outwardly extending lobe portions, each of said lobe portions having a peripherally and laterally open slot therein, a cutter bit positioned in each of said slots and each including a portion extending beyond the periphery of the respective lobe portion, each of said slots being inclined forwardly and peripherally outwardly from the inner end thereof to the periphery of said lobe portion in the direction of rotation of said head member and being inclined with respect to all lines passing through the axis of rotation of said head member and said slot in such direction as to define an angle of less than 90 degrees between the inner end of said slot and any of said lines, whereby each of said bits upon engagement with a work piece is forced against the bottom and the back wall of the respective slot, each of said cutter bits being of a width greater than the thickness of said head member and each including portions extending to opposite sides of said head member, each of said bits having a groove in the back face thereof adapted for the conformable reception of the back wall of said slot to retain said bits against lateral movement in said head member, each of said lobe portions having a bore therein extending from a point on the periphery of the respective lobe portion forwardly of the slot in the said lobe portion in the direction of rotation of said head member inwardly to the said slot, and a screw threaded in each of said bores and engaging the respective bit to retain said bit in said head against longitudinal movement, each of said bits having a hole therein of a diameter greater than said screws aligned with the respective bore, each of said screws including an inner end portion fitting within the hoe in the respective bit and engaging the bit at one margin of the hole therein, the bore in each of said lobe portions being inclined with respect to the slot therein to define an angle of less than 90 degrees between the open ends of said slot and said bore whereby the screw threaded in said bore engages the bit in the said slot at the margin of the hole in the bit adjacent the inner end thereof to force said bit against the bottom and the back wall of said slot, each of said screws having an axially located center of gravity, the axis of each of said bores being inclined with respect to a line extending from the axis of rotation of said head member to the center of gravity of the screw received in the respective bore in such direction as to define an angle of less than 90 degrees between the head end of said screw and said line, whereby upon rotation of said head member each of said screws is forced inwardly toward the respective bit by a component of the centrifugal force acting thereon and tends to tighten in its bore to take up any slack in the mounting of said bit.

References Cited in the file of this patent

UNITED STATES PATENTS

| | | |
|---|---|---|
| 345,662 | Blaney | July 20, 1886 |
| 1,013,540 | Faucette | Jan. 2, 1912 |
| 1,130,913 | Madson | Mar. 9, 1915 |

(Other references on following page)

UNITED STATES PATENTS

| | | |
|---|---|---|
| 1,190,197 | Shimer | July 4, 1916 |
| 1,620,847 | Whisler | Mar. 15, 1927 |
| 1,830,813 | Tautz | Nov. 10, 1931 |
| 1,908,628 | Redinger | May 9, 1933 |
| 2,561,470 | Hadley et al. | July 24, 1951 |

FOREIGN PATENTS

| | | |
|---|---|---|
| 24,424 | Finland | Dec. 15, 1950 |
| 53,629 | Switzerland | July 26, 1910 |